(12) United States Patent
Watanabe et al.

(10) Patent No.: US 10,419,639 B2
(45) Date of Patent: Sep. 17, 2019

(54) IMAGE READING APPARATUS THAT CALCULATES CORRECTION VALUES FOR CORRECTING OUTPUTS OF LIGHT RECEIVING ELEMENTS, AND SHADING CORRECTING METHOD FOR CORRECTING AN IMAGE READING APPARATUS

(71) Applicant: CANON KABUSHIKI KAISHA, Tokyo (JP)

(72) Inventors: Yoshiaki Watanabe, Tokyo (JP); Tsuyoshi Yamauchi, Kawasaki (JP); Shigeru Kawasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/644,892

(22) Filed: Jul. 10, 2017

(65) Prior Publication Data

US 2018/0020117 A1    Jan. 18, 2018

(30) Foreign Application Priority Data

Jul. 14, 2016    (JP) .................................. 2016-139525

(51) Int. Cl.
| | |
|---|---|
| *H04N 1/40* | (2006.01) |
| *H04N 1/401* | (2006.01) |
| *H04N 1/00* | (2006.01) |
| *H04N 1/10* | (2006.01) |
| *H04N 1/193* | (2006.01) |

(52) U.S. Cl.
CPC ......... *H04N 1/401* (2013.01); *H04N 1/00551* (2013.01); *H04N 1/10* (2013.01); *H04N 1/1061* (2013.01); *H04N 1/193* (2013.01); *H04N 2201/0081* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,067,175 | A | * 5/2000 | Heuer | .................. H04N 1/4076 348/223.1 |
| 2014/0139986 | A1 | * 5/2014 | Osakabe | ............ H04N 1/00554 361/679.01 |

FOREIGN PATENT DOCUMENTS

| | | | |
|---|---|---|---|
| JP | 2006072838 A | * | 3/2006 |
| JP | 2006-303710 A | | 11/2006 |

* cited by examiner

*Primary Examiner* — Barbara D Reinier
(74) *Attorney, Agent, or Firm* — Venable LLP (57) ABSTRACT

An image reading apparatus includes a line sensor to read an image of a document in a read area, a storage unit to store first reference data previously acquired by reading a first white reference member opposite to light receiving elements of the line sensor, a second white reference member of which a length is shorter than a length of the line sensor in the main scanning direction, an acquiring unit to acquire reference data read by the line sensor with the second white reference member and the line sensor opposed to each other, a correction unit to correct an output of the light receiving elements not opposite to the second white reference member, based on the stored first reference data and second reference data acquired by the light receiving elements opposite to the second white reference member among the reference data acquired by the acquiring unit.

8 Claims, 14 Drawing Sheets

023# IMAGE READING APPARATUS THAT CALCULATES CORRECTION VALUES FOR CORRECTING OUTPUTS OF LIGHT RECEIVING ELEMENTS, AND SHADING CORRECTING METHOD FOR CORRECTING AN IMAGE READING APPARATUS

CLAIM TO PRIORITY

This application claims the benefit of Japanese Patent Application No. 2016-139525 filed Jul. 14, 2016, which is hereby incorporated by reference wherein in its entirety.

BACKGROUND OF THE INVENTION

Field of the Invention

The present invention relates to the technique of shading correction in an image reading apparatus.

Description of the Related Art

An image reading apparatus of a flatbed type scans an image of a document placed on a document platen in a direction perpendicular to the longitudinal direction of an image sensor (i.e., a sub-scanning direction) so as to acquire a read image signal in an analog form. The image reading apparatus samples an analog image signal acquired by reading an image by a line sensor, followed by offset adjustment, gain adjustment, and the like, and then, converts the analog image signal into digital data in an A/D conversion section. The read image signal acquired by converting the analog image signal into the digital data is subjected to shading correction for correcting variations of each pixel caused by a reading sensor and a light source.

The shading correction includes black shading correction for correcting an offset of each pixel and white shading correction for correcting a gain of each pixel. An image reading apparatus disclosed in Japanese Patent Laid-Open No. 2006-303710 determines whether or not it is necessary to perform black and white shading correction before the start of reading, performs black and white shading correction of a read image, as necessary, and corrects the read image based on the result of the shading correction.

An image reading apparatus capable of white shading, like that disclosed in Japanese Patent Laid-Open No. 2006-303710, is adapted to read a white reference plate prior to the start of reading, and then, to correct an output value over the entire area of a line sensor based on the resultant white reference data. Therefore, a white reference plate is disposed over an area greater than the length of a read area of a document platen in a main scanning direction, and therefore, the width of the document platen in the main scanning direction becomes large, thereby raising a problem of a large size of the apparatus as a whole.

SUMMARY OF THE INVENTION

An object of the present invention is to provide an image reading apparatus capable of shading correction without increasing the size of a document platen, and an image reading method.

The present invention provides an image reading apparatus including a line sensor configured to read an image of a document placed in a read area, the line sensor having a plurality of light receiving elements, a storage unit configured to previously store therein first reference data that is acquired by reading a first white reference member by the line sensor, a comparison unit configured to compare second reference data that is acquired by reading a second white reference member by the line sensor with the first reference data stored in the storage unit, and a correction unit configured to subject output values from the plurality of light receiving elements to shading correction based on a comparison result from the comparison unit.

The present invention achieves shading correction without increasing the size of a document platen.

Further features of the present invention will become apparent from the following description of exemplary embodiments with reference to the attached drawings.

DESCRIPTION OF THE PREFERRED EMBODIMENTS

Hereafter, embodiments according to the present invention will be described in detail with reference to the attached drawings.

First Embodiment

Figure 1:
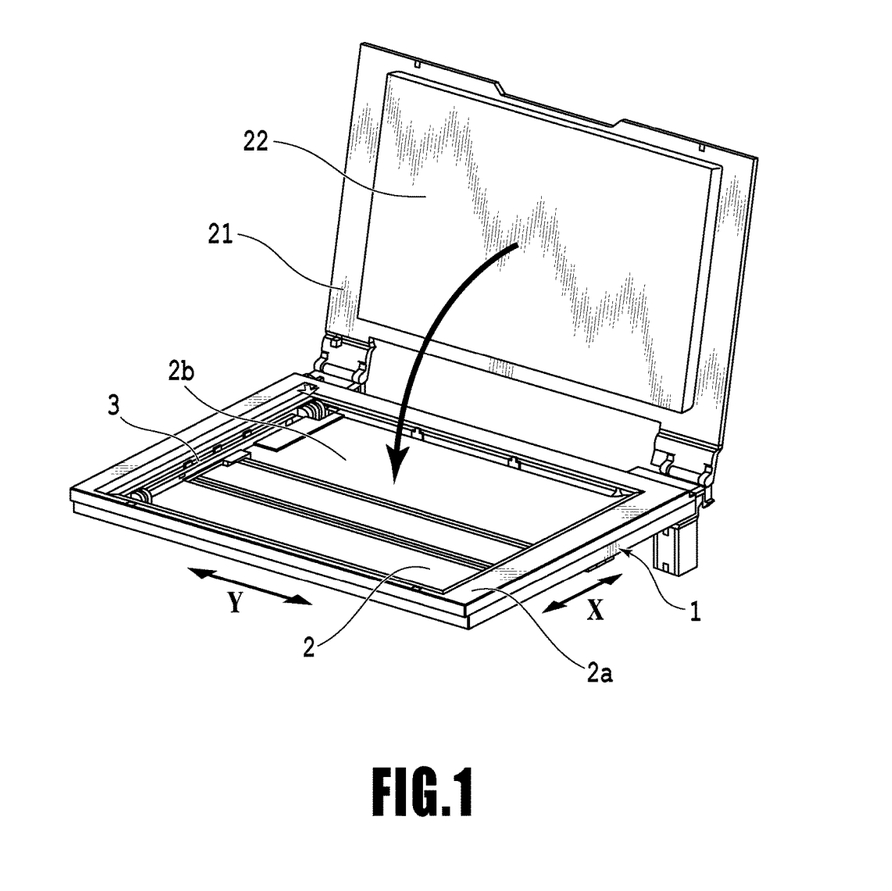
FIG. 1 is a perspective view showing the outside configuration of an image reading apparatus in an embodiment.
Figure 2:
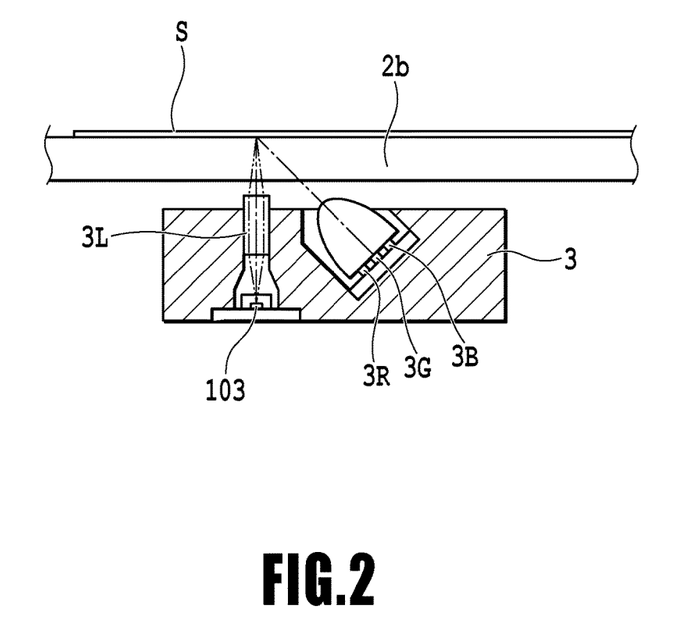
FIG. 2 is a cross-sectional view showing the schematic configuration of an image reading sensor.

FIG. 1 is a perspective view showing the outside configuration of an image reading apparatus 1 in the present embodiment, and FIG. 2 is a cross-sectional view showing the schematic configuration of an image reading sensor. Here, FIG. 1 shows the image reading apparatus that is detached from a composite machine equipped with a scanning function, a printing function, and a copying function.

As shown in FIG. 1, the image reading apparatus 1 of a flatbed type is provided with a document platen 2 (document table), on which a document is placed. The document platen 2 includes a rectangular platen frame 2a and a platen glass 2b (transparent plate) fixed to the inside of the platen frame 2a. On the back side of the composite machine is provided a platen cover 21 serving as a document pressing member for pressing a document placed on the platen glass 2b in an openable manner. A document pressing sheet (i.e., a second white reference member) 22 including a sheet member and sponge is stuck onto a surface opposite to the platen glass 2b in the platen cover 21.

Moreover, the image reading apparatus 1 includes an image reading sensor 3 for reading an image of a document placed on the platen glass 2b in such a manner as to move (sub-scan an image) in a Y direction in parallel to the platen glass 2b. The image reading sensor 3 incorporates therein LEDs 3R, 3G, and 3B serving as light sources for irradiating a document with light beams of three colors, a line sensor 103, and a rod lens array 3L for focusing, on a light receiving element of the line sensor 103, the light beams reflected on the document, as shown in FIG. 2. The line sensor 103 is adapted to switchably light the LEDs 3R, 3G, and 3B for the three colors in sequence, and reading the light beams of the three colors reflected on the document one by one, so as to decompose the colors. In this manner, the image is read.

In a case when a user reads a document, the user places a document on the platen glass 2b, closes the platen cover 2b, and then, instructs the apparatus to read an image. Thereafter, the image reading sensor 3 moves (sub-scans an image) in a sub-scanning direction so as to read the document as a whole.

Figure 3:
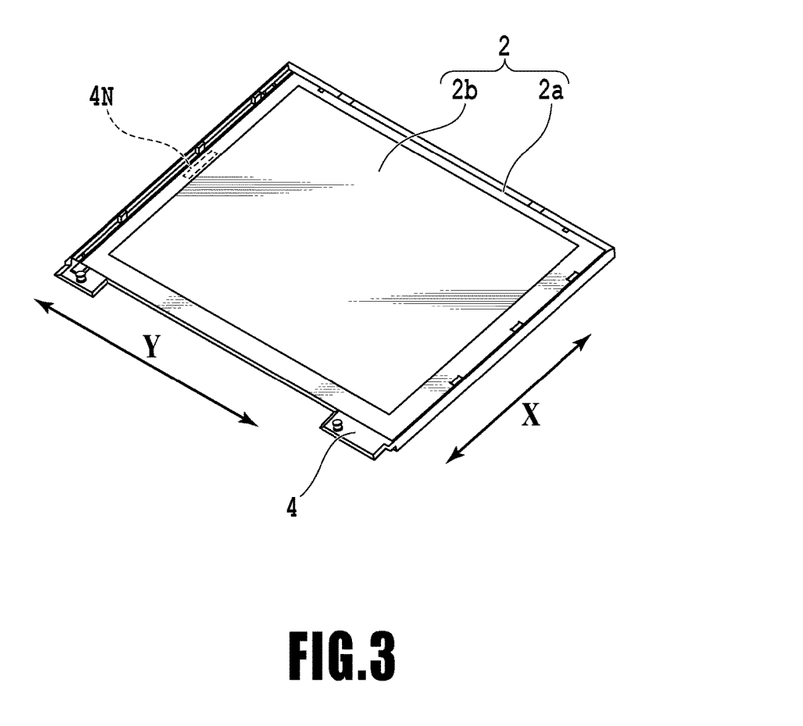
FIG. 3 is a perspective view showing a document platen provided at the upper part of the image reading apparatus, as viewed from the back side.

FIG. 3 is a perspective view showing the document platen 2 provided at the upper part of the image reading apparatus 1, as viewed at the reverse of the document platen 2 (i.e., a side other than the side of the platen glass 2b, at which the document is placed). A white reference plate (a second white reference member) 4N having the same white density as that of a white reference plate (a first white reference member) 6 (see FIG. 6) that is used on the side of a manufacturer is interposed between one end of the platen glass 2b in the sub-scanning direction (i.e., the Y direction) and one end of the platen frame 2a. The white reference plate 4N is arranged out of a document read area and within an area in which the line sensor 103 can read a document. The length of the white reference plate 4N is significantly less than that of the line sensor 103 in a main scanning direction (an X direction, also referred to as a predetermined direction) perpendicular to the sub-scanning direction. In other words, the length of the white reference plate 4N is significantly less than a distance between ends of an inside opening formed at the platen frame 2a in the sub-scanning direction. As a consequence, the white reference plate 4N cannot influence the outside dimension of the platen frame 2a in the main scanning direction. Moreover, the white reference plate 4N is covered in close contact with the platen frame 2a and the platen glass 2b, and therefore, cannot be affected by use environment, or the like, so that the white reference plate 4N can keep an initial reflection coefficient for a long period of time.

Figure 4:
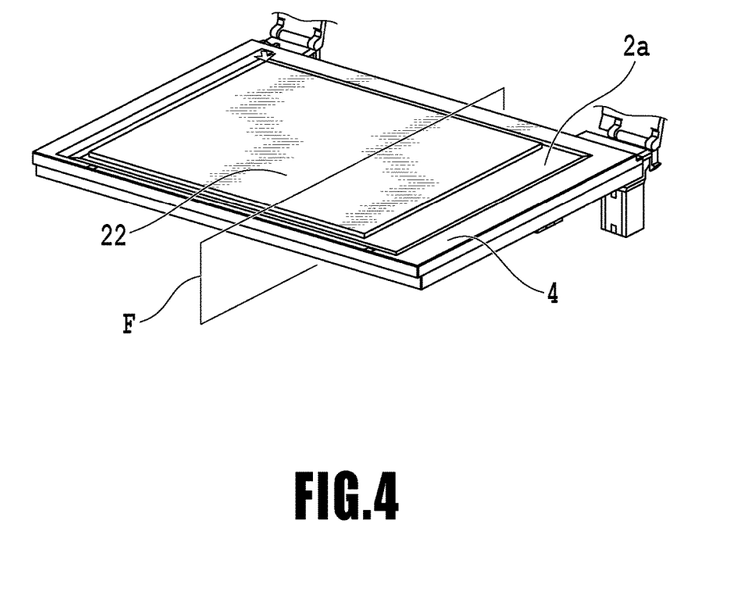
FIG. 4 is a perspective view showing a state in which a document pressing sheet is pressed against the obverse of a platen glass.
Figure 5:
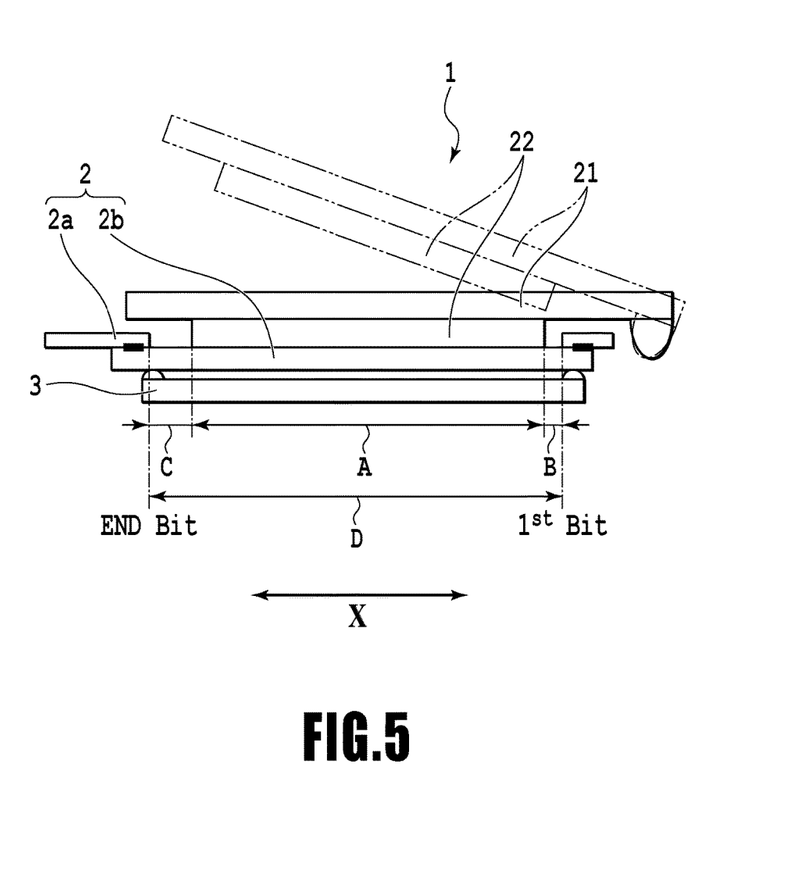
FIG. 5 is a vertical side view showing a state shown in FIG. 4, as cut along a plane F.

FIG. 4 is a perspective view showing a state in which the platen cover 21 shown in FIG. 1 is closed and the document pressing sheet 22 is pressed against the obverse of the platen glass 2b (i.e., a side on which a document is placed). Here, FIG. 4 omits the platen cover 21 in order to show the positional relationship between the document pressing sheet 22 and the platen glass 2b. Moreover, FIG. 5 is a vertical side view showing a state in which the document platen 2, the document pressing sheet 22, and the platen cover 21 are taken along a plane F shown in FIG. 4. As indicated by a solid line in FIG. 5, a dimension A of the document pressing sheet 22 in the main scanning direction is smaller than a dimension D of the opening inside of the platen frame 2a in the main scanning direction (i.e., the X direction). In a state in which the platen cover 21 is closed, clearances B and C are defined between outside ends of the document pressing sheet 22 in the main scanning direction and inside ends of the platen frame 2a in the main scanning direction. This avoids the interference of the outside ends of the document pressing sheet 22 with the document frame 2a when the platen cover 21 is closed. Here, the area of the platen glass 2b surrounded by the opening inside of the platen frame 2a is referred to as an area (an image read area) in which the line sensor 103 can read an image.

Figure 7:
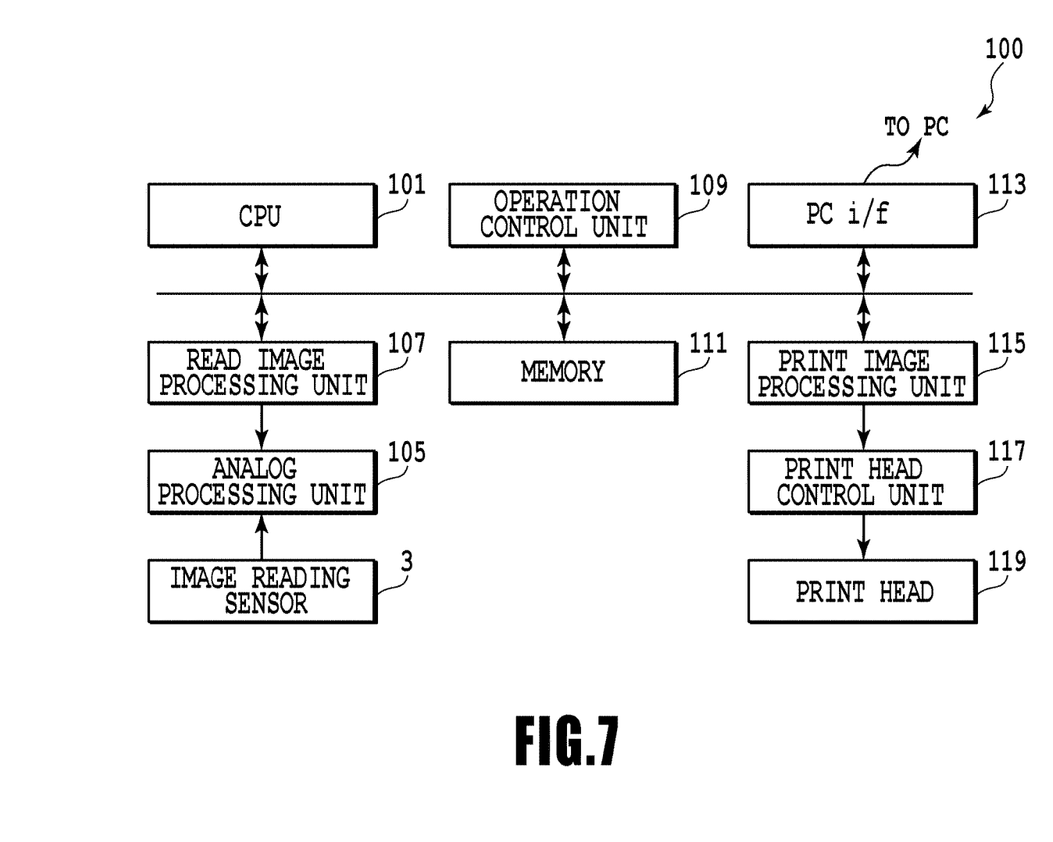
FIG. 7 is a block diagram illustrating the configuration of a control system of a composite machine including the image reading apparatus.

FIG. 7 is a block diagram illustrating the configuration of a control system of the composite machine including the above-described image reading apparatus. A CPU 101 is a control unit for controlling the entire composite machine through various operations, comparisons, judgements, and the like. This means that the CPU 101 fulfills the functions of a comparing unit and an estimating unit according to the present invention. In addition, the scanning function of the composite machine is fulfilled by the image reading sensor 3, an analog processing unit 105, and a read image processing unit 107. The line sensor 103 included in the image reading sensor 3 is an image sensor for reading image data, and includes an optical sensor having a plurality of light receiving elements such as CCDs arranged therein. The analog processing unit 105 is adapted to amplify, to sample, and to hold an analog image signal output from the line sensor 103, followed by A/D conversion, and then, outputs digital image data. The read image processing unit 107 subjects the digital image data output from the analog processing unit 105 to image processing such as edge enhancement or color conversion.

Additionally, the composite machine includes a memory 111, an operation control unit 109, and a PC I/F (interface) 113. The operation control unit 109 includes a key input for instructing operations such as the mode selection of a copy mode or a scan mode or the start of actions by a user and a display, and functions as a user interface. The PC I/F (interface) 113 transmits image data that was read by scanning to a personal computer (PC) whereas it receives image data or control data from the PC during printing. The memory 111 temporarily holds read image data or image data to be printed, and furthermore, holds information on shading, described later.

Additionally, the function of the composite machine as a printer is fulfilled by a print image processing unit 115, a print head control unit 117, a print head 119, and the like. The print image processing unit 115 magnifies image data to be printed, quantizes image data to be printed in conformity with the specifications of the print head, and the like. The print head control unit 117 is adapted to convert the form of image data output from the print image processing unit 115 into a form according to the print head so as to produce a head drive signal. The print head 119 is of an ink jet type, and ejects ink onto a sheet in response to a head drive signal.

Figure 8:
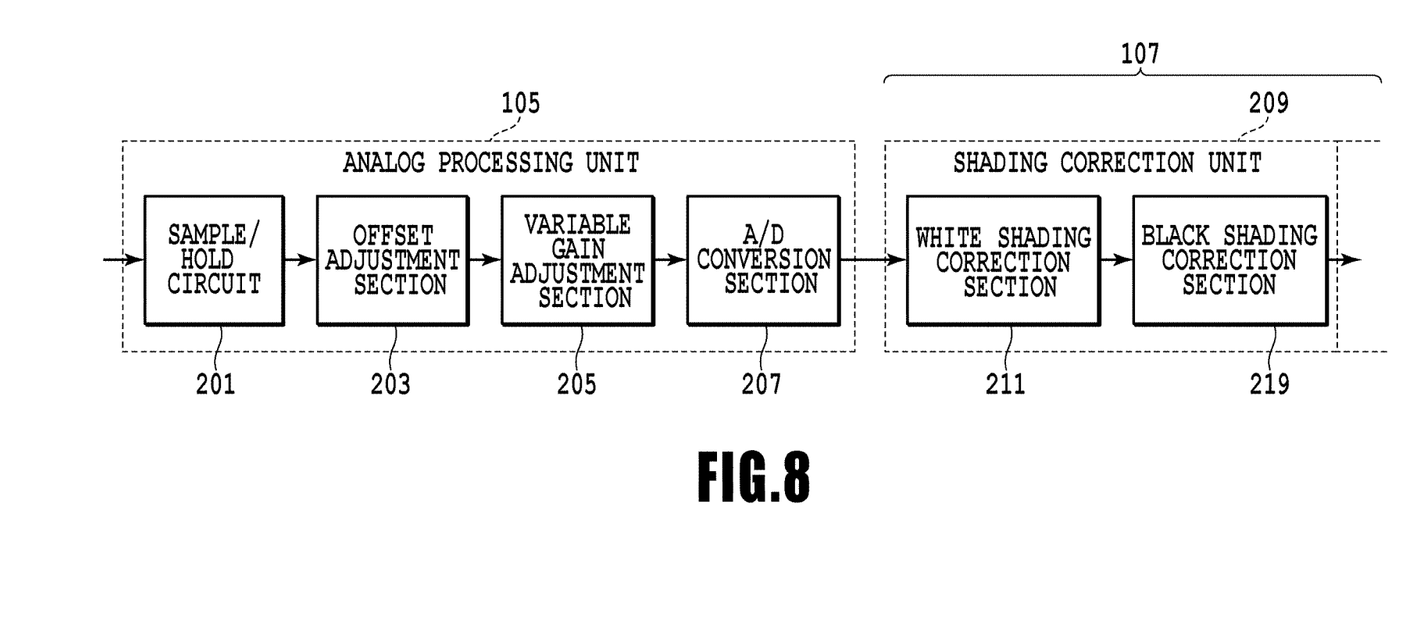
FIG. 8 is a block diagram illustrating an analog processing unit and a part of a read image processing unit that are illustrated in FIG. 7.

FIG. 8 is a block diagram illustrating, in more detail, the analog processing unit 105 and a part of the read image processing unit 107 in the configuration of the control system illustrated in FIG. 7. A sample hold circuit 201 samples an analog image signal read by the line sensor 103 (i.e., a read image signal), and furthermore, holds the sampled image signal for a predetermined period of time. An offset adjustment section 203 adds an offset voltage to the sampled/held analog signal so as to adjust the zero voltage of an A/D conversion section 207 disposed at a rear stage. A variable gain adjustment section 205 adjusts the gain of a signal output from the offset adjustment section 203 so as to set a signal whose gain is adjusted within a reference voltage of the A/D conversion section 207 disposed at the rear stage. The A/D conversion section 207 converts an analog signal output from the variable gain adjustment section 205 into a digital signal.

A shading correction unit 209 constitutes a part of the read image processing unit 107. The shading correction unit 209 includes two blocks, that is, a white shading correction section and a black shading correction section. The white shading correction section 211 acquires a white shading correction value used in correcting variations in gain and variations in light source per pixel of the digital image data. Moreover, the black shading correction section 219 acquires a black shading correction value used in correcting offset variations per pixel of the digital image data.

Next, an explanation will be made on shading correction to be performed on the side of a manufacturer of the image reading apparatus and shading correction performed on the side of a product purchaser (i.e., a user).

Figure 6:
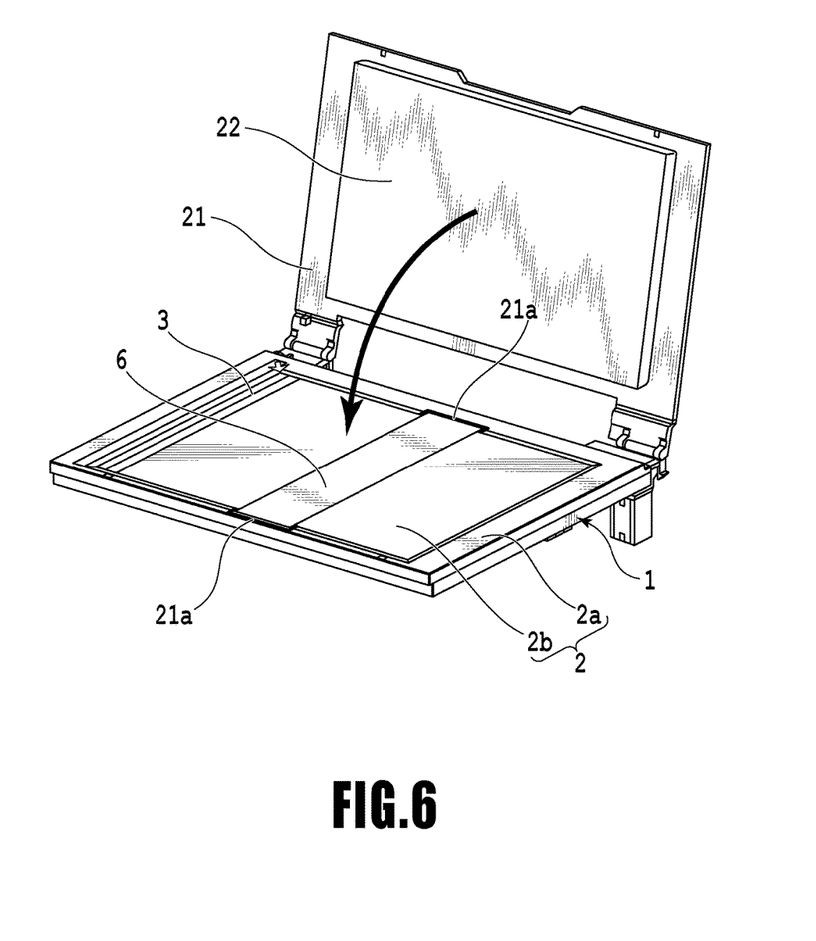
FIG. 6 is a perspective view showing an image reading sensor.

First, a description will be given of the shading correction to be performed on the side of a manufacturer. At the platen frame 2a for holding the platen glass 2b is formed a recess 21a, into which the white reference plate 6 is temporarily fitted during fabrication. Prior to the white shading, a user puts the white reference plate 6 on the platen glass 2b of the image reading apparatus 1 in such a manner as to fit the white reference plate 6 into the recess 21a of the platen frame 2a, as shown in FIG. 6. A white sheet is disposed at the lower surface of the white reference plate 6, that is, a surface in contact with the upper surface of the platen glass 2b.

Figure 9A:
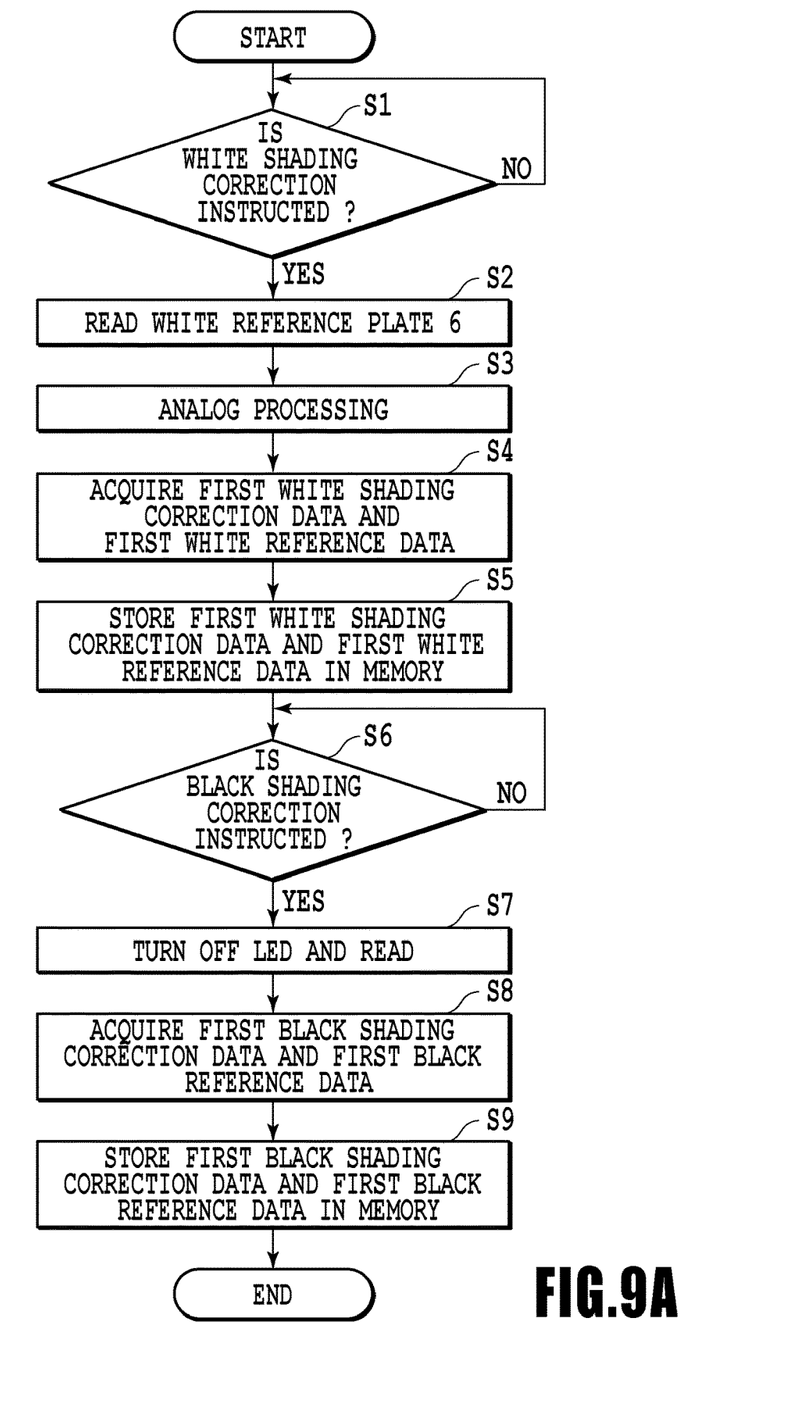
FIG. 9A is a flowchart illustrating the procedures of shading correction that is performed on the side of a manufacturer.

Thereafter, when the user instructs the shading correction at the operation control unit 109 (step S1), the CPU 101 performs the shading correction in accordance with procedures illustrated in FIG. 9A. First, read data on the first white reference plate using the white reference plate 6 is acquired (step S2). Specifically, the image reading sensor 3 is moved right under the white reference plate 6, and then, the LEDs 3R, 3G, and 3B in the image reading sensor 3 are sequentially turned on. In this manner, a light beam reflected on the white reference plate 6 is received by the line sensor 103 in the image reading sensor 3. The length of the line sensor 103 (see FIG. 2) is substantially the same as the width of the image read area in the main scanning direction. The line sensor 103 that received the light beam reflected on the white reference plate 6 outputs analog image data corresponding to each of pixels obtained by receiving light beams, that is, the read image data on the white reference plate 6. The analog read image data output from the line sensor 103 is converted into digital read image data by the analog processing unit 105 illustrated in FIG. 7 (step S3), and then, is input into the white shading correction section 211. The white shading correction section 211 acquires correction data (i.e., first white shading correction data) for use in equalizing values of pixels output from the line sensor 103 and corrected read image data (i.e., first white reference data). The first white reference data acquired herein and the first white shading correction data on each pixel from the line sensor 103 are stored in the memory 111 (step S5).

Subsequently, the user performs black shading correction. In the case of the black shading correction, the user detaches the white reference plate 6 shown in FIG. 6, and closes the openable platen cover 21 having the document pressing sheet 22 so as to avoid an influence by an outside light beam. Here, when the operation control unit 109 instructs the shading correction, the black shading correction section 219 performs the black shading correction (steps S6 and S7). In the case of the black shading correction, the image is read while the light source is turned off. Thereafter, the read analog image signal is converted into the digital image data by the analog processing unit 105 shown in FIG. 3. The converted digital image data is input into the black shading correction section 219. The black shading correction section 219 acquires correction data (first black shading correction data) for use in equalizing output values of pixels from the line sensor 103 and the corrected read image data (i.e., first black reference data) (step S8). The data acquired herein (i.e., the first black shading correction data and the first black reference data) on each pixel from the line sensor 103 is stored in the memory 111 (step S9).

The explanation has been made of a case in which the line sensor 103 is a monochromatic sensor. In a case when the line sensor 103 is a color sensor, data of three colors R, G, and B on each pixel are stored in a white shading memory and a black shading memory. The above-described procedures are performed at the time of the shading correction on the side of the manufacturer.

Next, an explanation will be made of shading correction to be performed when a user, or the like, who purchases a product after the shipment of the product uses an image reading apparatus. Here, the shading correction to be performed on the side of the user is not always needed in the case when an image acquired by the image reading apparatus matches an image level as desired by a product purchaser. However, in the case when it is determined that the quality of an image acquired by the image reading apparatus is reduced due to a secular change with a lapse of a predetermined time after the initial state of the product shipment, the shading correction on the side of a user (hereafter referred to as re-shading correction) is performed.

Figure 9B:
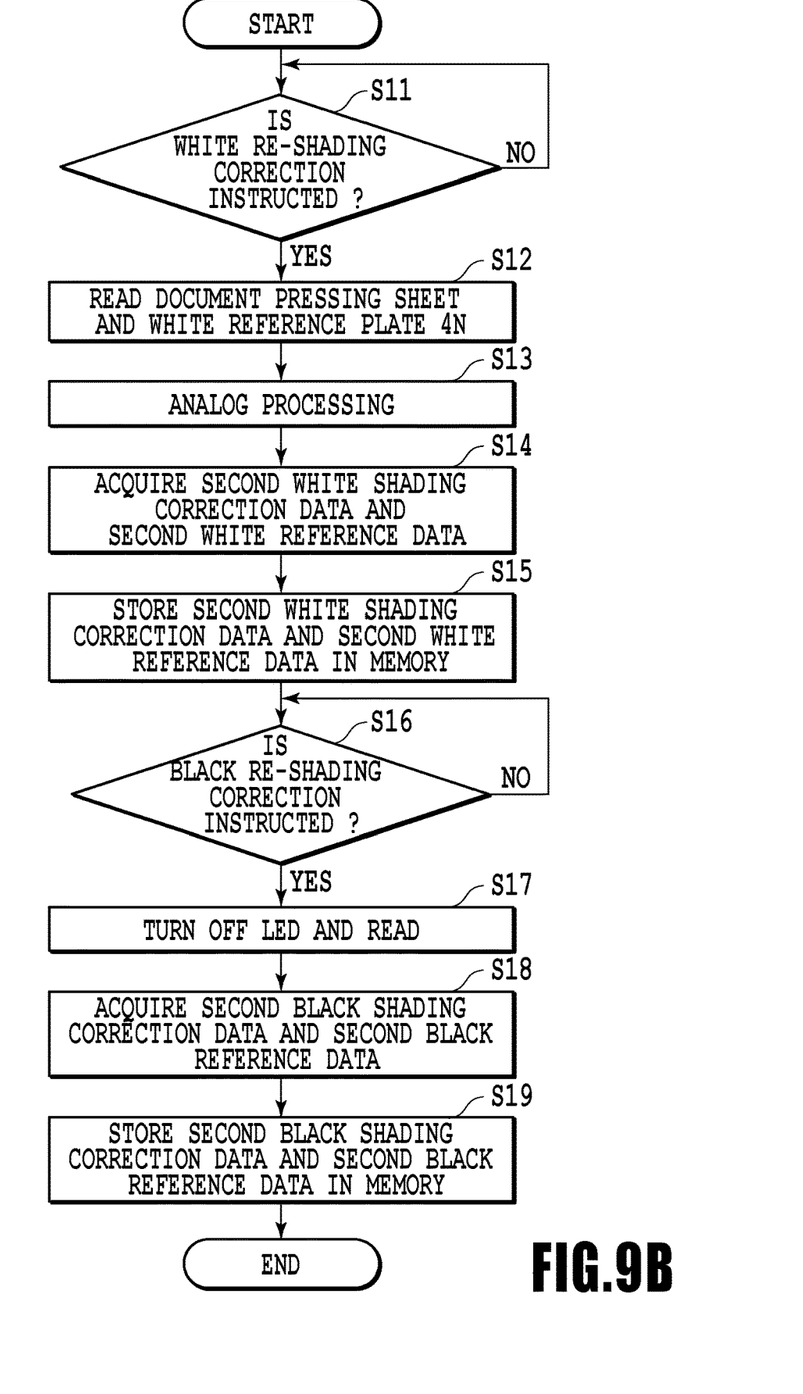
FIG. 9B is a flowchart illustrating the procedures of the shading correction that is performed on the side of a user.

In performing re-shading correction, first, a user closes the document platen 2 to bring it into close contact with the platen glass 2b. Thereafter, when the operation control unit 109 instructs the re-shading correction, the CPU 101 performs the shading correction in accordance with procedures illustrated in FIG. 9B. Upon receipt of the instruction of the re-shading correction (step S11), the CPU 101 performs the following processing.

First, the document pressing sheet 22 and the white reference plate 4N are read (step S12). Specifically, the image reading sensor 3 is moved right under the document pressing sheet 22, and then, the LEDs 3R, 3G, and 3B of the image reading sensor 3 are sequentially turned on, so that the line sensor 103 receives a light beam reflected on the document pressing sheet 22. The line sensor 103 receiving the light beam from the document pressing sheet 22 outputs analog image data on each pixel, that is, read image data on the document pressing sheet 22. After that, the read analog image data output from the line sensor 103 is converted into digital read image data at the analog processing unit 105 shown in FIG. 3 (step S13), to be thus input into the white shading correction section 211. The white shading correction section 211 acquires correction data (second white shading correction data) for use in equalizing output values of pixels from the line sensor 103 (step S14). The correction data (i.e., the second white shading correction data) on each pixel acquired herein from the line sensor 103 is stored in the memory 111 (step S15).

Moreover, the line sensor 103 is moved right under the white reference plate 4N to receive the light beams reflected on the LEDs 3R, 3G, and 3B that emit the light beams onto the white reference plate 4N, thus reading the white reference plate 4N. The read image data (i.e., the analog data) on the white reference plate 4N, output from the line sensor 103 is converted into a digital signal by the analog processing unit 105, and then, is stored in a white shading storage area in the memory 111 as second white reference data.

Figure 10:
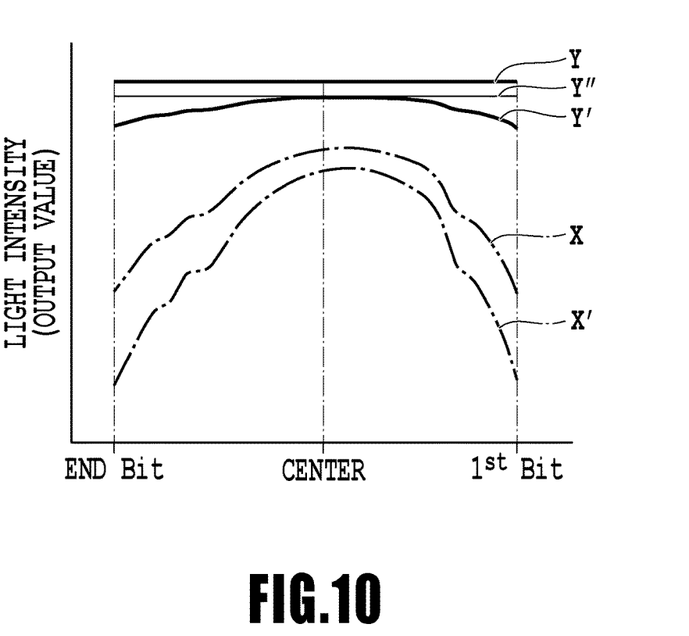
FIG. 10 is a graph illustrating the distribution of light intensity of a line sensor in a main scanning direction.

Here, an explanation will be made in more detail of the white re-shading correction. FIG. 10 illustrates the distribution of light intensity of the line sensor 103 in the main scanning direction in the case of the white shading correction while the document pressing sheet 22 is closed. In FIG. 10, reference character X designates the initial distribution of light intensity in the main scanning direction, acquired on the side of the manufacturer (the distribution of outputs from the line sensor), and furthermore, reference character X' denotes the distribution of light intensity (the distribution of outputs from the line sensor) in the case when a secular change, or the like, occurs on the side of a user after shipment.

As the distribution of light intensity is changed from X to X', the image data after the white shading correction is also changed from a state Y at the beginning of fabrication to a state Y' after the shipment, thereby degrading an image. The image is degraded caused by the reduced intensity of the light beam incident into the line sensor 103 due to reduced transparency with a smear on the rod lens array 3L or the platen glass 2b or a smear on the document pressing sheet.

Here, data representing a coefficient for use in correcting the distribution of the light intensity (output distribution) indicated by X acquired on the side of the manufacturer to uniform distribution data indicated by Y in FIG. 10 is the first white shading correction data acquired in step S4 in FIG. 9A. In the same manner, data representing a coefficient for use in correcting the distribution of the light intensity (output distribution) indicated by X' acquired on the side of the user to uniform distribution data indicated by Y'' in FIG. 10 is second white shading correction data acquired in step S14 in FIG. 9B.

Figure 11:
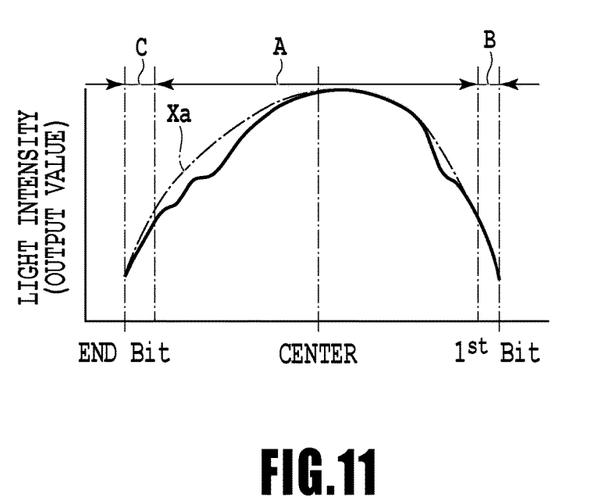
FIG. 11 is a graph illustrating an approximate curve of the distribution of the light intensity of the line sensor in the main scanning direction.

Next, referring to FIG. 11, a description will be given of the correction of the distribution of light intensity by the white shading correction. During the white shading correction, calibration for equalizing light intensity and density adjustment are performed. First, an explanation will be made of calibration.

As described above, the document pressing sheet 22 has the area A that is slightly narrower than the document area (see FIG. 5). As a consequence, the document pressing sheet 22 is not disposed in a peripheral area (an area B in FIG. 5) of a first bit (a 1st Bit) in FIG. 11 and a peripheral area (an area C in FIG. 5) of a final bit (an End Bit). Therefore, at the time of white re-shading correction, no light beam is reflected on the area B or the area C, so that the read image data cannot be acquired by the line sensor 103. In view of this, an approximate curve Xa is created based on the distribution of the light intensity (i.e., the distribution of outputs) in the area A in the main scanning direction in which the document pressing sheet 22 exists, and thus, light intensity distribution data on the areas B and C (second white shading correction data) is created. In this manner, the calibration can be achieved with a piece of sequential data corresponding to the entire read area (the areas B, A, and C).

Next, an explanation will be made of density adjustment. In terms of the density adjustment, the manufacturer compares the first white reference data acquired by using the white reference plate 6 during fabrication of an apparatus with the second white reference data acquired by using the white reference plate 4N. The above-described calibration corrects the second white shading correction data based on the comparison result. In this way, the white shading correction is completed.

In the meantime, the black shading correction is similar to the black shading correction performed by the manufacturer. After the document pressing sheet 22 is closed, the black shading correction is performed in response to a black re-shading instruction (step S16). In other words, once the black re-shading instruction is issued, the image data is read in a state in which the LED serving as a light source is turned off (step S17). Here, the read analog image signal is converted into the digital image data by the analog processing unit 105 shown in FIG. 3, and then, the digital image data is stored in a black shading area in the memory 111 by pixels from the line sensor 103 (steps S18 and S19).

Incidentally, the description has been given of the case when the line sensor 103 is a monochromatic sensor. However, in the case when the line sensor 103 is a color sensor, data on the three colors R, G, and B of each pixel are stored in a white shading area and a black shading area, respectively.

As described above, the present embodiment is configured such that the white shading correction is performed by using the white reference plate 4N having the dimension smaller than that of the image scanning area in the main scanning direction and the document pressing sheet 22, and therefore, downsizing can be achieved in comparison with the conventional document platen having the same image scanning area. In addition, the shading correction may be arbitrarily performed according to the result of the determination of the image read by the user. In this manner, it is possible to omit unnecessary shading correction against the user's intention in comparison with a conventional apparatus in which the shading correction is automatically performed every time the image is read, thus shortening a time required for image processing. Furthermore, it is possible to cope with the reduction of the light intensity to the line sensor caused by a secular change, so as to provide the apparatus having a longer lifetime.

Second Embodiment

Figure 12:
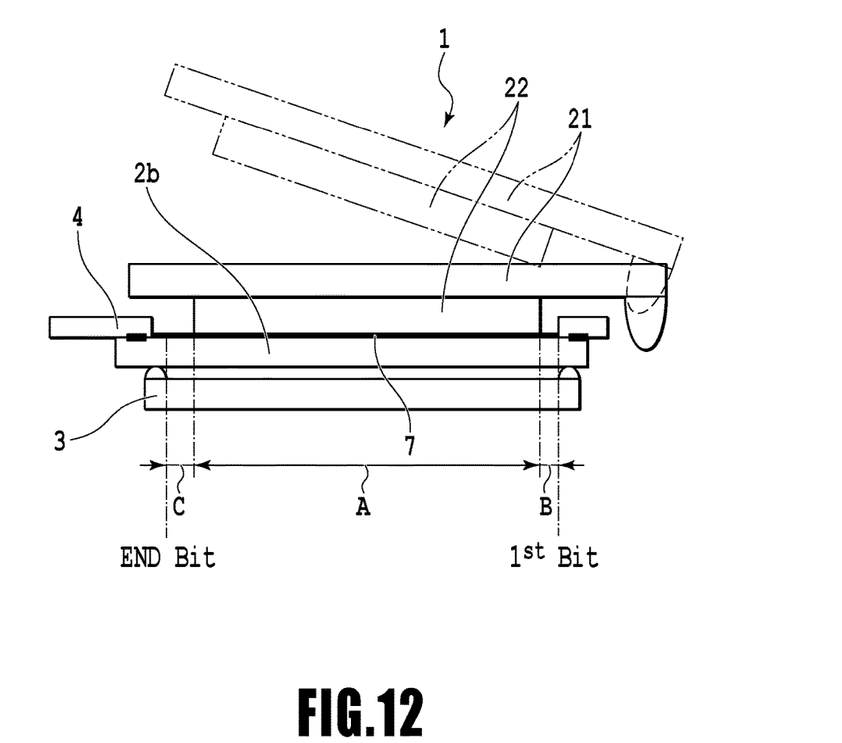
FIG. 12 is a view showing a sheet serving as a white reference member in a second embodiment.

In the above-described first embodiment, the calibration in the white re-shading correction is performed by using the document pressing sheet 22. In contrast, in this second embodiment, an achromatic and a bright color sheet 7 is used as a platen glass 2b for the purpose of calibration, as shown in FIG. 12.

Figure 13:
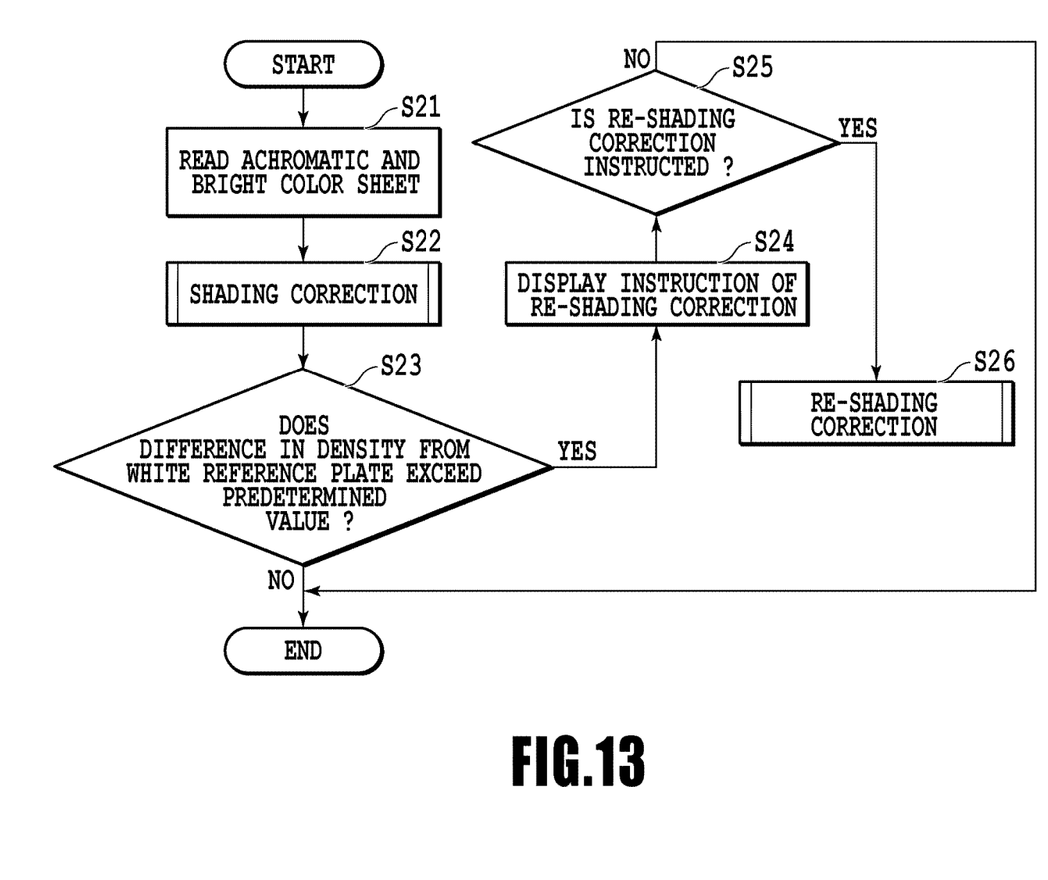
FIG. 13 is a flowchart illustrating processing to be performed in the second embodiment.

FIG. 13 is a flowchart illustrating processing to be performed in the present embodiment. In performing white shading correction, first, a user puts the achromatic sheet 7 having a low density on the platen glass 2b in such a manner as to cover the entire area in a main scanning direction, that is, all areas C, A, and B, as shown in FIG. 12. Next, a document pressing sheet 22 for pressing a document brings the achromatic sheet 7 having a low density into contact with the platen glass 2b under pressure. Thereafter, when the user instructs an apparatus to start reading, the sheet 7 is read (step S21), thereby acquiring image data that is calibrated based on the distribution of light intensity in a main-scanning read area. At this time, this calibration is performed in accordance with first white shading correction data acquired on the side of a manufacturer.

Subsequently, the data resulting from white shading correction is compared with a white reference plate 4N whose density has been already measured, followed by density adjustment. This leads to the completion of the white shading correction (step S22). Thereafter, it is determined whether or not the data resulting from the density adjustment exceeds a predetermined value (step S23). If the answer is affirmative, an operation control unit 109 illustrated in FIG. 7 displays that re-shading correction is needed (step S24).

A user who sees the display of the instruction of the re-shading correction determines whether or not the re-shading correction is performed. If the user determines that no re-shading correction is needed and does not instruct re-shading correction, the processing comes to an end. In this case, a shading correction value that was set on the side of a manufacturer is not changed, and is kept in a memory 111. In contrast, if the user determines that the re-shading correction is needed, the user instructs the re-shading correction via the operation control unit 109 illustrated in FIG. 7. Upon receipt of the instruction from the user, the re-shading correction is performed (steps S25 and S26). The re-shading correction is performed in accordance with procedures substantially similar to those illustrated in FIG. 9B. Second white shading correction data and second white reference data are stored in the memory 111. Here, since a light beam reflected on the sheet 7 is incident into the entire area of a line sensor in the present embodiment, it is unnecessary to create an approximate curve illustrated in FIG. 11. In other words, as in the first embodiment, shading correction in the area B around a 1st Bit and the area C around an End bit can be performed based not on estimation values but on actual measured values. Thus, a more favorable read image can be acquired according to the second embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image reading apparatus comprising:
    a line sensor configured to read an image of a document placed in a read area, the line sensor having a plurality of light receiving elements in a main scanning direction;
    a storage unit configured to store therein first reference data that is previously acquired by reading a first white reference member opposite to the plurality of light receiving elements of the line sensor;
    a second white reference member of which a length is shorter than a length of the line sensor in the main scanning direction;
    an acquiring unit configured to acquire reference data read by the line sensor in a condition in which the second white reference member and the line sensor are opposed to each other,
    a correction unit configured to correct an output of the light receiving elements not opposite to the second white reference member, based on the first reference data stored in the storage unit and second reference data acquired by the light receiving elements opposite to the second white reference member among the reference data acquired by the acquiring unit.

2. The image reading apparatus according to claim 1, wherein the correction unit estimates image data of the light receiving elements not opposite to the second white reference member, based on image data acquired by reading the second white reference member by the line sensor so as to subject light receiving elements of the line sensor to shading correction based on the estimated and read image data.

3. The image reading apparatus according to claim 1, wherein the second white reference member is dimensioned to cover the entire read area, and the correction unit performs shading correction based on image data acquired by reading the second white reference member by the line sensor.

4. The image reading apparatus according to claim 1, wherein the second white reference member is achromatic and has a low density.

5. The image reading apparatus according to claim 1, wherein the density of the second white reference member is higher than or equal to that of the first white reference member.

6. The image reading apparatus according to claim 1, wherein the second white reference member includes a document pressing sheet configured to bring a document placed in the read area into press-contact with the read area, the second white reference member having a uniform density at a side facing the read area.

7. The image reading apparatus according to claim 6, wherein the second white reference member includes the document pressing sheet and a white reference plate disposed along an end of the read area in the predetermined direction, and the correction unit performs shading correction based on read image data acquired by reading the document pressing sheet and the white reference plate.

8. A shading correcting method for correcting an image reading apparatus that includes a line sensor configured to read an image of a document placed in a read area, the line sensor having a plurality of light receiving elements in a main scanning direction, the method comprising the steps of:
    storing, in a storage unit, first reference data that is previously acquired by reading a first white reference member opposite to the plurality of light receiving elements of the line sensor;
    providing a second white reference member of which a length is shorter than a length of the line sensor in the main scanning direction;
    acquiring, in an acquiring unit, reference data read by the line sensor in a condition in which the second white reference member and the line sensor are opposed to each other; and
    correcting an output of the light receiving elements not opposite to the second white reference member, based on the first reference data stored in the storage unit and second reference data acquired by the light receiving elements opposite to the second white reference member among the reference data acquired by the acquiring unit.

* * * * *